(12) United States Patent
Okayama

(10) Patent No.: US 9,823,418 B2
(45) Date of Patent: Nov. 21, 2017

(54) WAVEGUIDE-TYPE OPTICAL DIFFRACTION GRATING AND OPTICAL WAVELENGTH FILTER

(71) Applicants: Oki Electric Industry Co., Ltd., Tokyo (JP); Photonics Electronics Technology Research Association, Tokyo (JP)

(72) Inventor: Hideaki Okayama, Tokyo (JP)

(73) Assignees: Oki Electric Industry Co., Ltd., Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/179,098

(22) Filed: Jun. 10, 2016

(65) Prior Publication Data

US 2017/0059779 A1    Mar. 2, 2017

(30) Foreign Application Priority Data

Aug. 25, 2015  (JP) ................................. 2015-165630

(51) Int. Cl.
*G02B 6/27*    (2006.01)
*G02B 6/293*   (2006.01)
(Continued)

(52) U.S. Cl.
CPC ......... *G02B 6/29397* (2013.01); *G02B 6/124* (2013.01); *G02B 6/1228* (2013.01);
(Continued)

(58) Field of Classification Search
USPC .......................................................... 385/37
See application file for complete search history.

(56) References Cited

U.S. PATENT DOCUMENTS 4,860,294 A    8/1989  Winzer et al.
5,764,826 A    6/1998  Kuhara et al.
(Continued)

FOREIGN PATENT DOCUMENTS

JP    08-163028 A    6/1996
JP    H11-14858 A    1/1999
(Continued)

OTHER PUBLICATIONS

Hirohito Yamada et al., "Si Photonic Wire Waveguide Devices", IEICE Transactions of Electronics, vol. E90-C, No. 1, pp. 59-64, Jan. 2007.
(Continued)

*Primary Examiner* — Eric Wong
(74) *Attorney, Agent, or Firm* — Rabin & Berdo, P.C.

(57) ABSTRACT

Provided is a waveguide-type optical diffraction grating. A waveguide core includes a waveguide core that is asymmetric with respect to a thickness direction perpendicular to a light propagating direction. In the waveguide core, a phase adjustment portion is configured to adjust a phase difference between a forward wave traveling in an input direction and a reflected wave traveling in a direction reverse to the input direction in the waveguide-type optical diffraction grating, and the phase adjustment portion is provided in a manner that a sum of a phase of the forward wave and a phase of the reflected wave which are generated in the phase adjustment portion becomes a constant value irrespective of a polarization state of input light to the waveguide-type optical diffraction grating.

5 Claims, 9 Drawing Sheets

(51) Int. Cl.
  *G02B 6/124* (2006.01)
  *G02B 6/122* (2006.01)
  *G02B 6/12* (2006.01)
(52) U.S. Cl.
  CPC ....... *G02B 6/2766* (2013.01); *G02B 6/29325* (2013.01); *G02B 2006/12061* (2013.01)

(56) References Cited

U.S. PATENT DOCUMENTS

| | | | |
|---|---|---|---|
| 5,960,135 A | 9/1999 | Ozawa | |
| 6,970,621 B1* | 11/2005 | Fried | G02B 6/10 385/11 |
| 7,072,541 B2 | 7/2006 | Kim et al. | |
| 2011/0038049 A1* | 2/2011 | Vallius | G02B 5/1809 359/575 |
| 2011/0049735 A1* | 3/2011 | Sakuma | G02B 6/124 264/1.24 |
| 2011/0053095 A1* | 3/2011 | Sakuma | G02B 6/124 430/321 |
| 2012/0002285 A1* | 1/2012 | Matsuda | B82Y 20/00 359/576 |
| 2012/0162770 A1* | 6/2012 | Walter | G02B 5/18 359/566 |
| 2013/0011947 A1 | 1/2013 | Yanagisawa | |
| 2013/0308666 A1 | 11/2013 | Ishikawa et al. | |

FOREIGN PATENT DOCUMENTS

| | | |
|---|---|---|
| JP | 2003-309321 A | 10/2003 |
| JP | 2006-235380 A | 9/2006 |
| JP | 2013-016650 A | 1/2013 |
| JP | 2013-258398 A | 12/2013 |

OTHER PUBLICATIONS

Wei Shi et al., "Add-Drop Filters in Silicon Grating-Assisted Asymmetric Couplers", Optical Fiber Communication Conference, OTh3D.3, pp. 1-3, 2012.

* cited by examiner

WAVEGUIDE-TYPE OPTICAL DIFFRACTION GRATING AND OPTICAL WAVELENGTH FILTER

CROSS REFERENCE TO RELATED APPLICATION(S)

This application is based upon and claims benefit of priority from Japanese Patent Application No. 2015-165630 filed on Aug. 25, 2015, the entire contents of which are incorporated herein by reference.

BACKGROUND

The present disclosure relates to a waveguide-type optical diffraction grating and an optical wavelength filter which perform wavelength selection without depending on polarization.

In recent years, as for a subscriber optical access system, a passive optical network (PON) communication system has become mainstream in which one office-side optical line termination apparatus (optical line terminal (OLT)) and a plurality of subscriber-side optical line termination apparatus (optical network units (ONUs)) are connected via an optical fiber and a star coupler, and the OLT is shared by the plurality of ONUs. In the communication system, an optical signal wavelength used in a downlink communication and an optical signal wavelength used in an uplink communication are made different so that the downlink communication directed to the ONU from the OLT and the uplink communication directed to the OLT from the ONU may not interfere with each other.

Therefore, a multiplexing/de-multiplexing device is necessary for de-multiplexing/multiplexing optical signals which are used in each of the downlink communication and the uplink communication and have different wavelengths from each other. Generally, an OLT and an ONU are constituted by spatially coupling an optical wavelength filter as the multiplexing/de-multiplexing device, a photodiode (PD) and a laser diode (LD) for realizing a function to transmit/receive optical signals having different wavelengths from each other. Although an alignment work for aligning optical axes among the optical wavelength filter, the PD and the LD becomes necessary for spatial coupling, an optical wavelength filter which makes the alignment work for aligning optical axes unnecessary and are constituted by using a waveguide, has been developed. In addition, a technology using silicon-based material as waveguide material attracts attention because of its superiority in miniaturization and mass productivity in forming the optical wavelength filter. (For example, refer to U.S. Pat. No. 4,860,294B, U.S. Pat. No. 5,764,826B, U.S. Pat. No. 5,960,135B, U.S. Pat. No. 7,072,541B and JP H08-163028A).

As an optical wavelength filter which can be used in the subscriber optical access system, an optical wavelength filter which uses a Mach-Zehnder interferometer, an optical wavelength filter which uses a directional optical coupler, an optical wavelength filter which uses a waveguide-type optical diffraction grating and the like are known. As for the optical wavelength filter which uses the Mach-Zehnder interferometer made up of a silicon waveguide, it is difficult to miniaturize the device because it is necessary to connect Mach-Zehnder interferometers in multiple stages. In addition, when the directional optical coupler is used as an optical wavelength filter, it is vulnerable to a wavelength deviation of a light source because a transmission factor within a transmitting region has wavelength dependency. In addition, as for the directional optical coupler, it is also difficult to miniaturize the device because its device length is approximately hundreds of micrometers.

As an optical wavelength filter which uses the waveguide-type optical diffraction grating, an optical wavelength filter which is formed by using a silicon substrate is disclosed (refer to Hirohito Yamada, et. al., "Si Photonic Wire Waveguide Devices" IEICE Transactions of Electronics vol. E90-C, No. 1, pp. 59-64, January 2007). In addition, an optical wavelength filter which uses the waveguide-type optical diffraction grating of a mode conversion type in a multimode waveguide is also disclosed in JP 2006-235380A. Alternatively, an optical wavelength filter constituted by combining the waveguide-type optical diffraction grating and the directional optical coupler is also disclosed (refer to Wei Shi, et. al., "Add-Drop Filters in Silicon Grating-Assisted Asymmetric Couplers" Optical Fiber Communication Conference 2012 OTh3D.3).

Furthermore, disclosed is a device with diversity in the reflection spectrum characteristics while various deformed regions are formed in a periodic structure of the waveguide-type optical diffraction grating. For example, a structure where ¼ wavelength shift (λ/4 phase shift) region is provided in the middle of the waveguide-type optical diffraction grating is disclosed in JP 2003-309321A, and an optical wavelength filter having a structure where a period of the waveguide-type optical diffraction grating changes gradually is disclosed in JP H11-14858A. According to a configuration, a transmitted wavelength peak having a very thin line width is acquired in a transmitted light spectrum.

In addition, a device in which a modulated period diffraction grating (sampled grating) is adopted as the waveguide-type optical diffraction grating is disclosed (refer to JP 2013-258398A and JP 2013-16650A). The optical wavelength filter based on the sampled grating has a plurality of transmitted wavelength peaks in the transmitted light spectrum, and therefore, is suitable to be used as a wavelength separation filter for a multi-channel optical signal based on frequency multiplexing.

SUMMARY

However, as for an optical wavelength filter using a conventional waveguide-type optical diffraction grating, a wavelength selection function has polarization dependency because diffraction efficiency (that is, reflection factor) with respect to transverse magnetic (TM) polarization and a reflection factor with respect to transverse electric (TE) polarization are different from each other.

Accordingly, an optical wavelength filter using a conventional waveguide-type optical diffraction grating is difficult to be used in a subscriber optical access system that processes an optical signal in which a TM polarization component and a TE polarization component are mixed. Then, it is desired to realize an optical wavelength filter which uses a waveguide-type optical diffraction grating having no polarization dependency in wavelength selection properties.

Then, the present inventor has paid attention to the point that reflection spectrum characteristics (operation characteristics as an optical wavelength filter) can be controlled by modulating variously a periodic structure of the waveguide-type optical diffraction grating. Then, it has been conceived that polarization conversion can be realized by making a thickness direction of the waveguide-type optical diffraction grating asymmetric, and forming a structure in which overlapping of a TM polarized wave and a TE polarized wave is large, even in a case of the waveguide-type optical diffraction grating with a period modulated. In addition, it has been conceived that a propagation mode order can be converted by making both propagation constants equal between a TM polarization fundamental propagation mode and a TE polarization first order propagation mode. Here, the propagation mode means a propagation lateral mode, and when it is assumed that confusion will not arise in particular, the propagation lateral mode is simply described as the propagation mode.

In addition, the present inventor has investigated an optical wavelength filter to realize the polarization conversion and the wavelength selection by constituting separately a device which executes the polarization conversion and a device which realizes the wavelength selection function by Bragg reflection and combining the both devices.

Then, it is preferred to provide a waveguide-type optical diffraction grating and an optical wavelength filter in which control of reflection spectrum characteristics is possible and which operate without depending on polarization.

To achieve the above described issues, a waveguide-type optical diffraction grating according to an embodiment of the present invention includes the following features.

A waveguide core included in the waveguide-type optical diffraction grating is asymmetric with respect to a thickness direction perpendicular to a light propagating direction. A period of the waveguide-type optical diffraction grating is modulated. In addition, a phase adjustment portion configured to adjust a phase difference between a forward wave traveling in an input direction and a reflected wave traveling in a direction reverse to the input direction in the waveguide-type optical diffraction grating is provided. A sum of a phase of the forward wave and a phase of the reflected wave is set to be a constant value irrespective of a polarization state of input light to the waveguide-type optical diffraction grating.

An optical wavelength filter includes: a polarization rotation element configured to include a taper-shaped waveguide core having a waveguide core width in which a propagation constant of a TM polarization fundamental propagation mode and a propagation constant of a TE polarization first order propagation mode become equal, the polarization rotation element being asymmetric with respect to a thickness direction perpendicular to a light propagating direction; and the waveguide-type optical diffraction configured to diffract a TE polarization fundamental propagation mode and the TE polarization first order propagation mode. The polarization rotation element and the waveguide-type optical diffraction grating are connected in series in a waveguide direction.

One of the features of the waveguide-type optical diffraction grating according to an embodiment of the present disclosure is that a period in which a function as an optical diffraction grating is exhibited is modulated. Accordingly, it is possible to set reflection spectrum characteristics freely to a certain extent, and when use as an optical wavelength filter is assumed, a remarkable effect that operation characteristics can be designed in accordance with applications is acquired.

In addition, since a waveguide core included in the waveguide-type optical diffraction grating is asymmetric with respect to a thickness direction as mentioned above, a polarization state of a forward wave traveling in the input direction of input light in the waveguide-type optical diffraction grating can be diffracted into a polarization state of the reflected wave. Therefore, it becomes possible to change the polarization state of the forward wave into the polarization state of the reflected wave.

As the result, it becomes possible that the TE polarization fundamental propagation mode is input into the waveguide-type optical diffraction grating, is converted to the TM polarization fundamental propagation mode, and is made to be output and conversely, the TM polarization fundamental propagation mode is input, is converted to the TE polarization fundamental propagation mode, and is made to be output. Alternatively, it becomes possible that the TE polarization fundamental propagation mode is input into the waveguide-type optical diffraction grating, is converted to the TE polarization first order propagation mode, and is made to be output, and conversely, the TE polarization first order propagation mode is input, is converted to the TE polarization fundamental propagation mode, and is made to be output.

Furthermore, even when the period of the waveguide-type optical diffraction grating is modulated, acquired is an effect that mutual polarization conversion between the TM polarization component and the TE polarization component can be realized without depending on polarization by providing a phase adjustment portion to adjust a phase difference between the forward wave and the reflected wave.

On the other hand, according to the optical wavelength filter of the present embodiment, the conversion from the TM polarization fundamental propagation mode to the TE polarization first order propagation mode can be performed by the polarization rotation element, and the conversion from the TE polarization fundamental propagation mode to the TE polarization first order propagation mode or the conversion from the TE polarization first order propagation mode to the TE polarization fundamental propagation mode is performed by the waveguide-type optical diffraction grating. In addition, since the optical wavelength filter of the embodiment has a configuration where the polarization rotation element and the waveguide-type optical diffraction grating mentioned above are connected in series in a waveguide direction, operation characteristics of the waveguide-type optical diffraction grating are added in addition to operation characteristics of the polarization rotation element. As a result, according to the optical wavelength filter of the embodiment, acquired is an effect that the input light having the TM polarization fundamental propagation mode is converted into the output light having the TE polarization fundamental propagation mode and conversely, the input light having the TE polarization fundamental propagation mode is converted into the output light having the TM polarization fundamental propagation mode.

BRIEF DESCRIPTION OF THE DRAWINGS

FIGS. 2A to 2C are schematic plan views illustrating the waveguide-type optical diffraction gratings of a phase shift type, a sampled grating type, and a super-period grating type, respectively;

DETAILED DESCRIPTION OF THE EMBODIMENT(S)

Figure 1A:
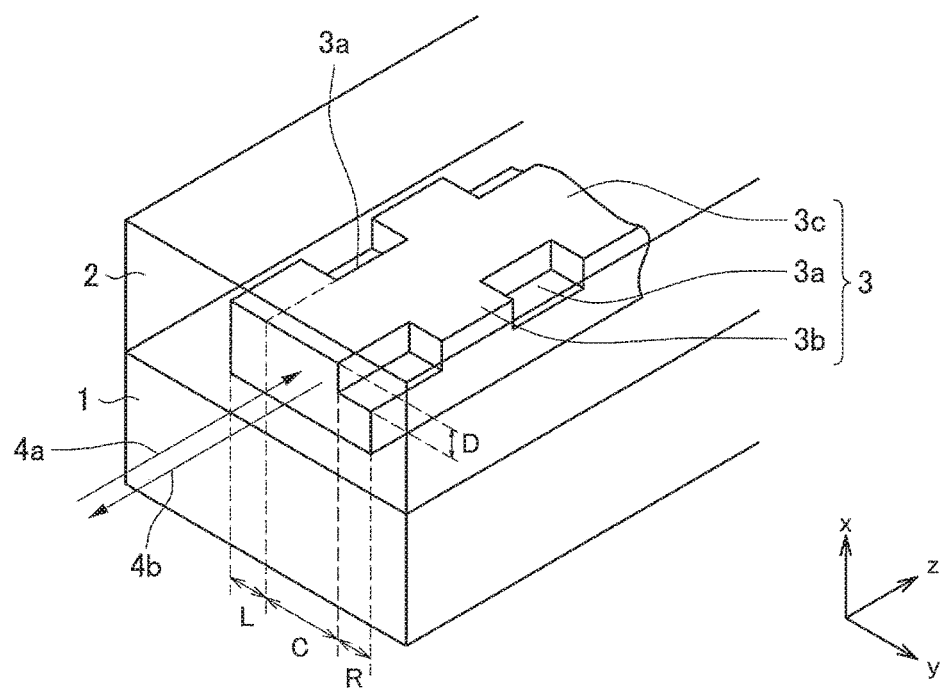
FIGS. 1A to 1C are presented for describing a basic configuration of a waveguide-type optical diffraction grating according to the embodiments of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<<Basic Configuration of Waveguide-Type Optical Diffraction Grating>>

Figure 1B:
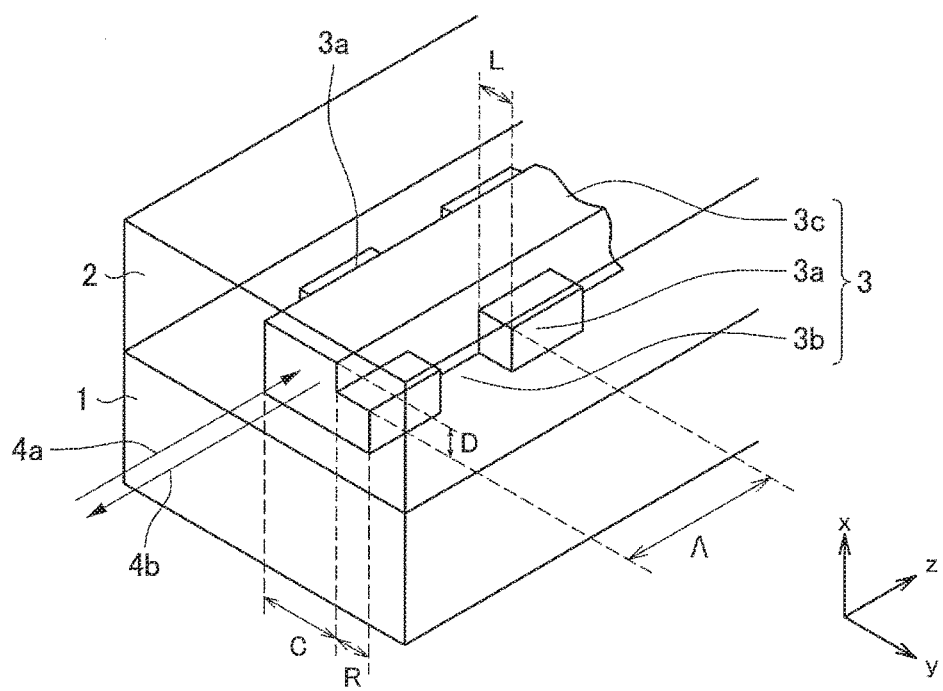
Figure 1C:
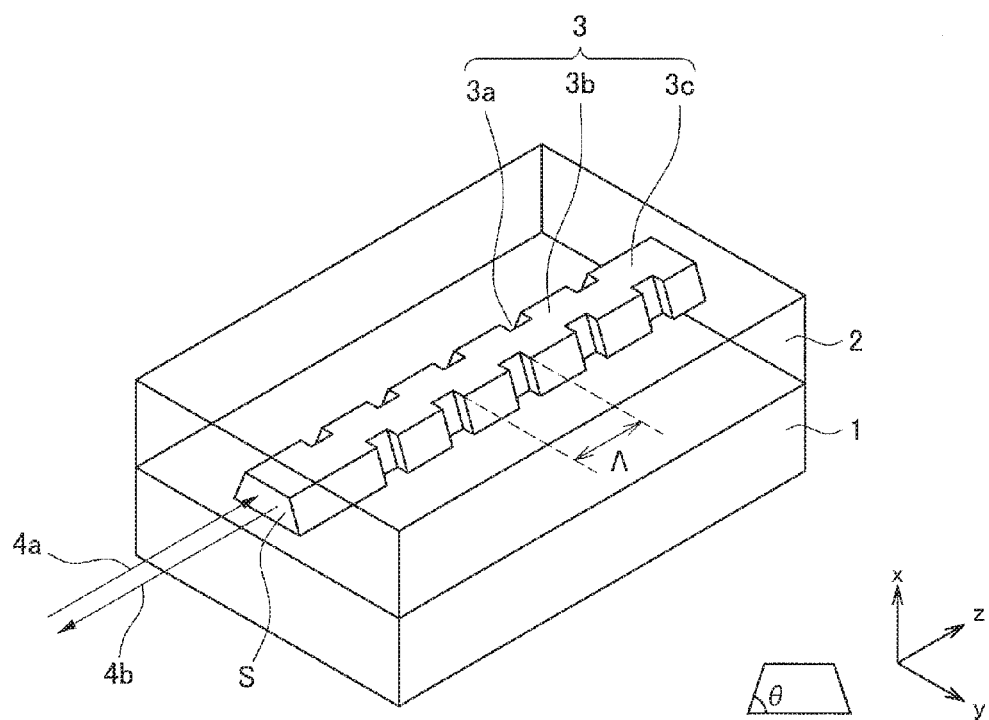

A basic form which constitutes a periodic structure of a waveguide-type optical diffraction grating will be described with reference to FIGS. 1A to 1C. The waveguide-type optical diffraction grating illustrated in FIGS. 1A to 1C is a Bragg reflection type optical diffraction grating where a period of the equivalent refractive index change is set to be uniform. Here, although a simple configuration where modulation is not applied to the period is described for the purpose of describing the basic form for changing the equivalent refractive index, the waveguide-type optical diffraction grating of the present embodiment has the period modulated as described later.

As for the waveguide-type optical diffraction grating illustrated in FIGS. 1A to 1C, a waveguide core 3 included in the waveguide-type optical diffraction grating is enclosed by a clad layer 2, and the waveguide core 3 and the clad layer 2 are formed on a substrate 1. For example, the waveguide core 3 and the substrate 1 are formed of silicon material, and the clad layer 2 is formed of silicon oxide material. Here, a left-side waveguide area L, a center waveguide area C and a right-side waveguide area R are set along a waveguide direction in the waveguide core 3.

Here, for convenience of explanation, the waveguide direction is defined as a z-axis direction, a width direction of the waveguide is defined as a y-axis direction, and a depth direction of the waveguide is defined as an x-axis direction as illustrated in FIGS. 1A to 1C.

In FIGS. 1A to 1C, illustrated is a state where a TM polarized wave is input into the waveguide-type optical diffraction grating (input light 4a), and is output as a TE polarized wave after Bragg reflection (output light 4b). Alternatively, it may be assumed that a state where a TE polarized wave is input into the waveguide-type optical diffraction grating (input light 4a), and is output as a TM polarized wave after Bragg reflection (output light 4b) is illustrated.

In order to realize a relation of orthogonal polarization where a polarization direction of the input light 4a and a polarization direction of the output light 4b are orthogonal to each other, the left-side waveguide area L and right-side waveguide area R of the waveguide core 3 are asymmetric with respect to the x-axis direction (thickness direction of the waveguide core).

Generally, a direction of a beam of light which propagates in the waveguide is not in agreement with a central direction of the waveguide, and leans at a fixed angle. Therefore, an amplitude vector indicating a vibrating direction of the TE polarized wave and TM polarized wave which propagate in the waveguide has a z-axis component other than an x-axis component and a y-axis component when the waveguide direction is taken as the z-axis direction.

That is, the input light 4a and the output light 4b have mutually the same propagation lateral mode, and the left-side waveguide area L and the right-side waveguide area R are formed so as to be asymmetric with respect to the depth direction (x-axis direction). Thereby, the TM polarization component and the TE polarization component are exchanged via a photoelectric field component (z-axis direction component) in a propagating direction which the TM polarization component and the TE polarization component have in common. Then, according to such a configuration, diffraction efficiency given by overlap integral of the TM polarization component and TE polarization component which propagate in the waveguide-type optical diffraction grating can be increased. That is, the output light 4b becomes the TE polarized wave with respect to the input light 4a which is the TM polarized wave, and the output light 4b becomes the TM polarized wave with respect to the input light 4a which is the TE polarized wave. In other words, polarization of the output light becomes orthogonal polarization with respect to polarization of the input light, and the output light having the same intensity is acquired without depending on the polarization direction of the input light.

FIG. 1A illustrates the waveguide-type optical diffraction grating formed such that a portion gouged out periodically in a vertical direction with respect to the waveguide direction is provided in the left-side waveguide area L and the right-side waveguide area R, and the other portion is left as it is while the thickness of the waveguide is maintained. Hereinafter, the waveguide-type optical diffraction grating having such a form may be referred to as Type A.

In the waveguide-type optical diffraction grating of Type A, a width of the left-side waveguide area L and a width of the right-side waveguide area R are equal, and portions (hereinafter, referred to as first portions 3a) gouged out periodically are provided in the left-side waveguide area L and the right-side waveguide area R. A depth D of the excavation in the x-axis direction is made smaller than the thickness of the waveguide in the center waveguide area C in the first portions 3a. As the result, since the waveguide core remains in the first portions 3a, the waveguide core becomes asymmetric with respect to the x-axis direction (thickness direction of the waveguide core).

The first portions 3a are arranged in laterally antisymmetric positions with the center waveguide area C as a center. A second portion 3b that is a portion other than the first portions 3a of the left-side waveguide area L and right-side waveguide area R is made as thick as the waveguide of center waveguide area C. A third portion 3c is a portion of the waveguide core which forms the center waveguide area C.

By arranging the first portions 3a in the laterally antisymmetric positions with the center waveguide area C as a center, the input light 4a and output light 4b to/from the waveguide-type optical diffraction grating of Type A can be set to have mutually the same propagation lateral mode.

As the depth D of the excavation of the first portions 3a which is gouged out from the thickness of the waveguide of the center waveguide area C is made smaller, the manufacturing process becomes easier. On the other hand, when the depth D of the excavation is made small, many propagation lateral modes excited in the waveguide core 3 are generated, and a plurality of noise components (light components other than the wavelength to be selected and propagation lateral mode) is included in the wavelength and propagation lateral mode of the output light output while separated. Accordingly, a possibility that wavelength selection may not be performed sufficiently may arise.

As for the light which propagates in the waveguide core 3, the refractive index to which a photoelectric field component propagating in the left-side waveguide area L and the right-side waveguide area R is sensitive is substantially smaller than the refractive index to which the photoelectric field component propagating in the center waveguide area C is sensitive. A photoelectric field distribution of a first order propagation mode is strong in both sides of the waveguide core 3, and weak in the center of the waveguide core 3. On the other hand, the photoelectric field distribution of a fundamental propagation mode is strong in the center of the waveguide core, and weak in both sides of the waveguide core. Accordingly, the equivalent refractive index of the first order propagation mode is smaller than the equivalent refractive index of the fundamental propagation mode. Therefore, the equivalent refractive index to the first order propagation mode of the TE polarization component becomes smaller than the equivalent refractive index to the fundamental propagation mode of the TM polarization component.

As a result, a wavelength difference between a diffracted wavelength from the TE polarization fundamental propagation mode to the TE polarization first order propagation mode and a diffracted wavelength from the TE polarization fundamental propagation mode to the TM polarization fundamental propagation mode can be increased, and a diffracted wave to the TE polarization first order propagation mode and a diffracted wave to the TM polarization fundamental propagation mode become easy to be separated. That is, according to the waveguide-type optical diffraction grating of Type A, the output light has few noise components (wavelength components other than the Bragg reflection light to be selected), and excellent wavelength selectivity and excellent polarization plane selectivity are realized.

FIG. 1B illustrates an embodiment of a waveguide-type optical diffraction grating formed so that a thickness of a portion other than gouged portions in the left-side waveguide area L and the right-side waveguide area R becomes zero. Hereinafter, the waveguide-type optical diffraction grating having such a form may be referred to as Type B.

The waveguide-type optical diffraction grating of Type B is formed so that second portions 3b in the left-side waveguide area L and the right-side waveguide area R are removed completely and the thickness of the portions may become zero as illustrated in FIG. 1B. That is, while the first portions 3a (the thickness of the waveguide core of this portions is reduced by D from the thickness of the center waveguide area C) are left, the formation is carried out so that the waveguide core may not exist in the second portions 3b. A width of the left-side waveguide area L and a width of the right-side waveguide area R are equal, and the first portions 3a are arranged in laterally antisymmetric positions with the center waveguide area C as a center. The third portion 3c is a portion of the waveguide core which forms the center waveguide area C.

The waveguide-type optical diffraction grating of Type B is formed such that the second portions 3b are removed completely and the thickness of these portions becomes zero. Accordingly, a difference between a refractive index to which a photoelectric field component propagating in the center waveguide area C is sensitive and a refractive index to which a photoelectric field component propagating in the left-side waveguide area L and the right-side waveguide area R is sensitive is increased more effectively. Therefore, the waveguide-type optical diffraction grating which is excellent in wavelength selectivity will be realized. By forming the second portions 3b so as to have the thickness of zero, an equivalent refractive index to the TE polarization first order propagation mode can be made smaller more effectively than an equivalent refractive index to the TM polarization fundamental propagation mode. Therefore, an effect that a diffracted wavelength from the TE polarization fundamental propagation mode to the TE polarization first order propagation mode is apart from a diffracted wavelength from the TE polarization fundamental propagation mode to the TM polarization fundamental propagation mode is acquired. Therefore, according to the waveguide-type optical diffraction grating of Type B, the output light has fewer noise components, and more excellent wavelength selectivity and more excellent polarization plane selectivity are realized.

In the waveguide-type optical diffraction gratings of Type A and Type B, the input light 4a and the output light 4b with respect to the waveguide core 3 can be set to have mutually the same propagation lateral mode of the same order by arranging the first portions 3a in the laterally antisymmetric positions with the center waveguide area C as a center.

FIG. 1C illustrates a waveguide-type optical diffraction grating where cuts are made periodically in the left-side waveguide area L and right-side waveguide area R of the waveguide, and a sectional shape cut in a direction perpendicular to the waveguide direction is formed in a trapezoidal shape. Hereinafter, the waveguide-type optical diffraction grating having such a form may be referred to as Type C.

The waveguide-type optical diffraction grating of Type C has a trapezoidal sectional shape S cut in a direction perpendicular to the waveguide direction (both base angles are made to be θ) as illustrated in FIG. 1C. Then, a diffraction grating is constituted while grooves 3a are formed at equal intervals in the direction perpendicular to the waveguide direction in both sides of the waveguide core 3. By making the sectional shape into the trapezoid, the left-side waveguide area L and right-side waveguide area R of the waveguide core 3 become asymmetric with respect to the x-axis direction (thickness direction of the waveguide core).

The grooves 3a are antisymmetric to each other with respect to the center portion 3c. Thereby, the input light 4a and the output light 4b to/from the waveguide-type optical diffraction grating of Type C can be set to have the propagation lateral mode of mutually the same order.

A direction of a beam of light which propagates in the waveguide-type optical diffraction grating of Type C is not in agreement with a central direction of the waveguide, and leans at a fixed angle. Therefore, an amplitude vector indicating a vibrating direction of the TE polarized wave and TM polarized wave which propagate in the waveguide has a z-axis component other than an x-axis component and a y-axis component. Then, according to the waveguide (here, trapezoid waveguide) whose sectional shape cut in a direction perpendicular to the z-axis direction is asymmetric, it is possible to set a large overlap of the z-axis direction components of the TE polarized wave and TM polarized wave which propagate in the waveguide. Accordingly, it is possible to couple the TE polarized wave and the TM polarized wave via the z-axis direction components of the TE polarized wave and the TM polarized wave.

<Waveguide-Type Optical Diffraction Grating with Period Modulated>

A modulated period structure set in the waveguide-type optical diffraction grating will be described with reference to FIGS. 2A to 2C.

In the basic configuration of the waveguide-type optical diffraction grating mentioned above, an example where a period is not modulated has been described. However, in the waveguide-type optical diffraction grating of the present embodiment, the period is modulated under a fixed rule, and a phase adjustment portion which adjusts a phase difference between a forward wave traveling in an input direction and a reflected wave traveling in a direction reverse to the input direction in the waveguide-type optical diffraction grating is provided. Then, the modulated period structure and phase adjustment portion which are set in the waveguide-type optical diffraction grating of the present embodiment will be described with reference to FIGS. 2A to 2C.

Figure 2A:
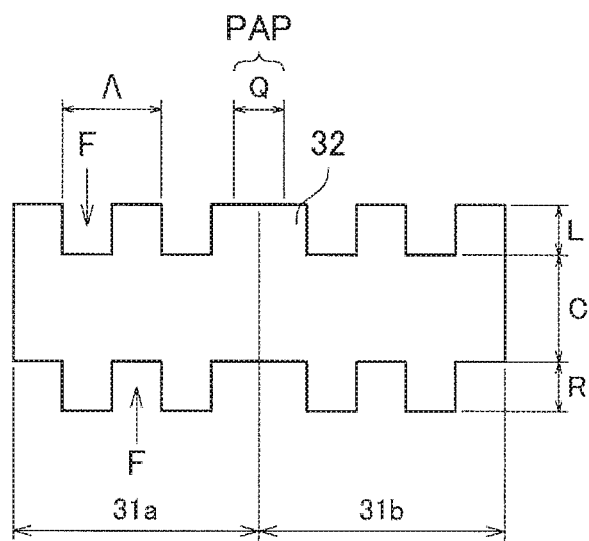
FIGS. 2A to 2C each illustrate schematically a planar shape of a waveguide core included in a waveguide-type optical diffraction grating according to the embodiments of the present invention.
Figure 2B:
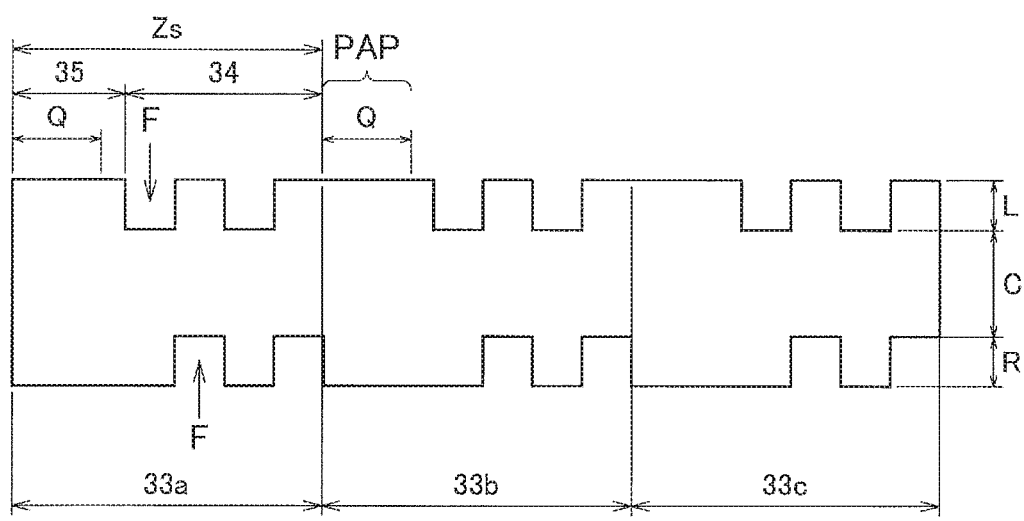
Figure 2C:
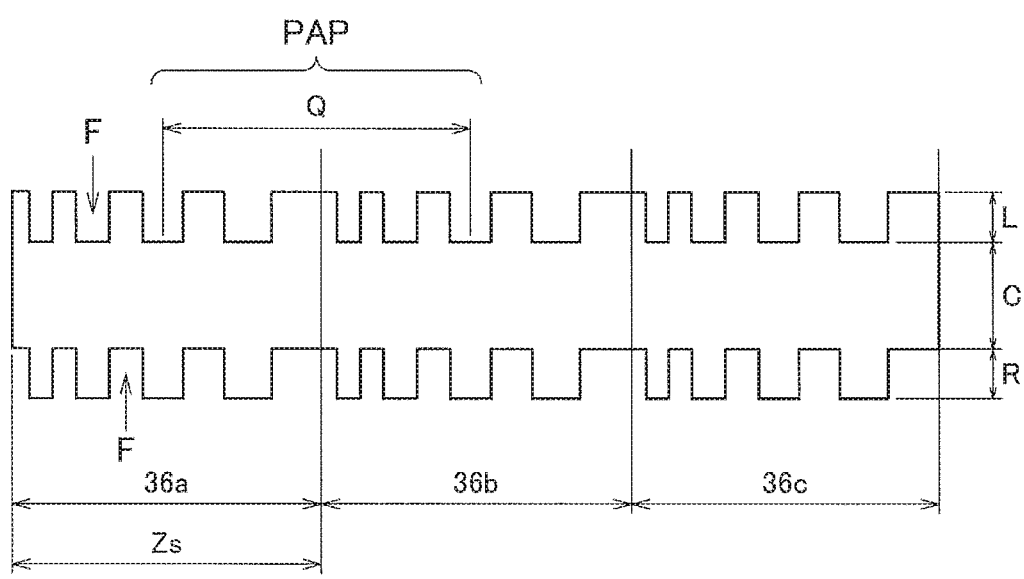

FIGS. 2A to 2C each illustrates schematically a planar shape of a waveguide core included in a waveguide-type optical diffraction grating, and three period modulation types are illustrated. In FIGS. 2A to 2C, a left-side waveguide area L, a center waveguide area C and a right-side waveguide area R are set along the waveguide direction in the waveguide core included in the waveguide-type optical diffraction grating for convenience of explanation. The width of the left-side waveguide area L and the width of the right-side waveguide area R are equal.

The waveguide-type optical diffraction grating (hereinafter, also referred to as a waveguide-type optical diffraction grating of a phase shift type) where a phase shift portion 32 which breaks the periodic structure is provided in the waveguide core included in the waveguide-type optical diffraction grating, and the phase adjustment portion (PAP) including a part of the phase shift portion 32 is set will be described with reference to FIG. 2A.

Grooves F are provided periodically in the left-side waveguide area L and the right-side waveguide area R except for the phase adjustment portion PAP, and the grooves F are arranged in the laterally antisymmetric position with the center waveguide area C as a center. The waveguide-type optical diffraction grating of the phase shift type is configured in a manner that a first unit 31a and a second unit 31b that have been obtained by dividing the waveguide-type optical diffraction grating of a normal type with the grooves F provided periodically into equal length are joined while sandwiching the phase adjustment portion PAP therebetween.

Then, the length in the waveguide direction of the portion of the phase adjustment portion PAP is defined as Q. In the phase adjustment portion PAP, the length Q is set so that a sum of a phase of the forward wave and a phase of the reflected wave may be a constant value irrespective of a polarization state of light propagating in the phase adjustment portion PAP. In the waveguide-type optical diffraction grating illustrated in FIG. 2A, the length Q is determined as follows. While a period of the grooves F formed in the first unit 31a and the second unit 31b is assumed to be Λ and f is assumed to be an integer no less than 2, Q=Λ/f is assumed.

Here, if f=2, a ¼ wavelength shift structure will be given. In the structure of f=2, a narrow wavelength band where light is transmitted is formed in the middle of a Bragg reflection wavelength spectrum. When the length Q is set while a value of f is changed to 3, 4, . . . , the wavelength transmission band moves from one end to the other end of a Bragg reflection band in a wavelength spectrum.

In the first unit 31a and the second unit 31b, the grooves F are provided so as to be antisymmetric to each other in the left-side waveguide area L and the right-side waveguide area R. By thus providing the grooves F so that the positions thereof are antisymmetric to each other, the input light 4a and output light 4b with respect to the waveguide-type optical diffraction grating can be made to have propagation lateral modes that are identical to each other, or different in polarization depending on the structures.

Although only two units (the first unit 31a and second unit 31b) are used in FIG. 2A, three or more of unit structures having the same shape as the two units (the first unit 31a and the second unit 31b) can be arranged in series. It is possible to change reflection spectrum characteristics by changing the number of unit structures as described above.

With reference to FIG. 2B, described will be a waveguide-type optical diffraction grating (hereinafter, also referred to as the waveguide-type optical diffraction grating of a sampled grating type) where, as for the waveguide core included in the waveguide-type optical diffraction grating, a plurality of unit regions each of which is made up of a non-optical diffraction grating region where a periodic structure is not formed and an optical diffraction grating region where the periodic structure provided adjacently to the non-optical diffraction grating region are provided continuously in the waveguide direction, and the phase adjustment portion PAP is set in the non-optical diffraction grating region.

The grooves F are provided periodically in the left-side waveguide area L and the right-side waveguide area R except for the phase adjustment portion PAP, and positions where the grooves F are formed are arranged in the laterally antisymmetric position with the center waveguide area C as a center.

Although a first unit 33a, a second unit 33b and a third unit 33c are illustrated in FIG. 2B, an optical diffraction grating region 34 where the grooves F are formed periodically and a non-optical diffraction grating region 35 where the groove F is not formed are provided in each unit. The waveguide-type optical diffraction grating of the sampled grating type is formed by connecting a plurality of such units of the same kind in series. When a length along the waveguide direction of each unit such as the first unit 33a is assumed to be a unit period Zs, a plurality of reflection peaks appears in the Bragg reflection wavelength spectrum at a wavelength period given by following Formula (1), where $n_{gf}$ is assumed to be a group refractive index of a forward wave and $n_{gb}$ is assumed to be a group refractive index of a reflected wave.

$$\Delta\lambda = \lambda^2 / [(n_{gf} + n_{gb})Zs] \quad (1)$$

In addition, the phase adjustment portion PAP is set over a length Q from a boundary line between units arranged adjacently in the non-optical diffraction grating region 35 where the periodic structure is not formed.

With reference to FIG. 2C, described is a waveguide-type optical diffraction grating (hereinafter, also referred to as a waveguide-type optical diffraction grating of a super-period grating type) where a plurality of unit regions formed with a period as an optical diffraction grating chirped are provided continuously in the waveguide direction of the waveguide core, and the phase adjustment portion PAP is set with a boundary of adjacent unit regions as a center.

The grooves F are provided in the left-side waveguide area L and the right-side waveguide area R, and positions where the grooves F are formed are arranged in laterally asymmetric positions with the center waveguide area C as a center. The phase adjustment portion PAP is set over a length Q including the boundary line between units arranged adjacently (the center of the non-optical diffraction grating region where the periodic structure is not formed).

A first unit 36a, a second unit 36b and a third unit 36c are illustrated in FIG. 2C. The waveguide-type optical diffraction grating of the super-period grating type is formed by connecting one or more units of the same kind in series in addition to the first to third units. When a length along the waveguide direction of each unit such as the first unit 36a is assumed to be a unit period Zs, a structure where a super-period grating with a period thereof chirped is repeated at a period of Zs is formed. By adjusting a way of chirping in the super-period grating, it becomes possible to make uniform the heights of a plurality of Bragg reflection peaks in the Bragg reflection wavelength spectrum.

Here, operation characteristics of the waveguide-type optical diffraction gratings illustrated in FIGS. 2A to 2C will be described. The phase adjustment portion PAP is provided in the waveguide-type optical diffraction grating illustrated in each of FIGS. 2A to 2C. A length along the waveguide direction of the phase adjustment portion PAP is assumed to be Q, and a sum of a phase of the forward wave and a phase of the reflected wave which are generated in the phase adjustment portion PAP is assumed to be φ. In this case, since polarization or mode conversion is generated by reflection in the waveguide-type optical diffraction grating, the sum φ of the phase of the forward wave and the phase of the reflected wave is given by the following Formula (2), where k is assumed to be a wave number of the forward wave and reflected wave in a vacuum, $n_f$ is assumed to be an equivalent refractive index of the forward wave, and $n_b$ is assumed to be an equivalent refractive index of the reflected wave.

$$\varphi = kQ(n_f + n_b) \quad (2)$$

When the input light to the waveguide-type optical diffraction grating illustrated in each of FIGS. 2A to 2C is a TE polarized wave input, $n_f = n(e)$ and $n_b = n(m)$. However, when the input light is a TM polarized wave input, $n_f = n(m)$ and $n_b = n(e)$. Here, n(e) denotes an equivalent refractive index of the TE polarization fundamental propagation mode, and n(m) denotes an equivalent refractive index of the TM polarization fundamental propagation mode. Since the same phase φ is generated in the phase adjustment portion PAP even when the input light is the TE polarized wave or when the input light is the TM polarized wave, characteristics without depending on polarization are expected.

When the forward wave has the TE polarization fundamental propagation mode and the reflected wave has the TE polarization first order propagation mode in the phase adjustment portion PAP, $n_f = n(e0)$, and $n_b = n(e1)$. On the other hand, when the forward wave has the TE polarization first order propagation mode, and the reflected wave has the TE polarization fundamental propagation mode, $n_f = n(e1)$, and $n_b = n(e0)$. Here, n(e0) denotes an equivalent refractive index of the TE polarization fundamental propagation mode, and n(e1) denotes an equivalent refractive index of the TE polarization first order propagation mode. Since the same phase φ is generated in the phase adjustment portion PAP even in such cases, characteristics without depending on polarization are expected.

<<Optical Wavelength Filter>>

An optical wavelength filter where a polarization rotation element and the waveguide-type optical diffraction grating described with reference to above-mentioned FIGS. 2A to 2C are connected in series in a waveguide direction will be described with reference to FIGS. 3A and 3B. The optical wavelength filter is a device which realizes a polarization conversion function and a Bragg diffraction effect separately, and realizes an optical wavelength filter without depending on polarization while carrying out polarization conversion as a whole.

Figure 3A:
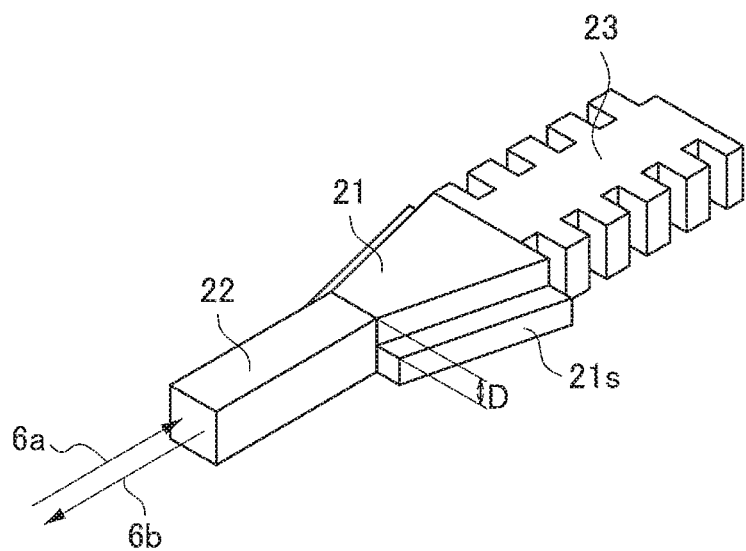
FIGS. 3A and 3B are presented for describing an optical wavelength filter according to the embodiments of the present invention, in which a polarization rotation element and a waveguide-type optical diffraction grating are connected in series in a waveguide direction.
Figure 3B:
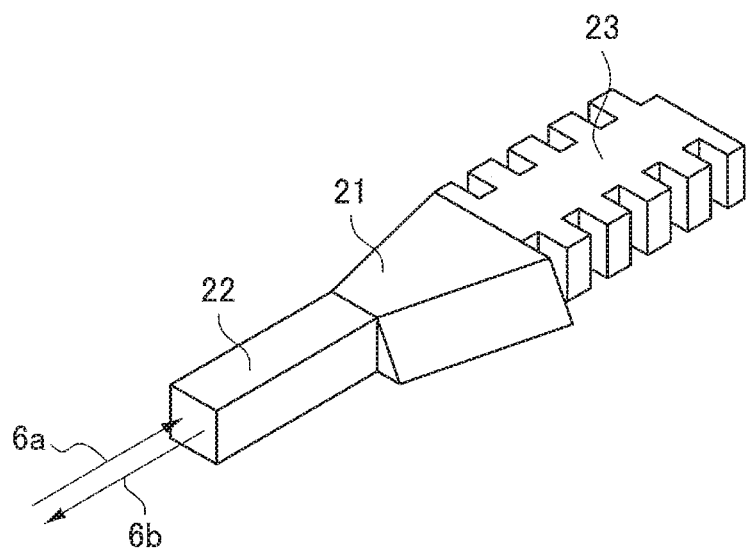

A waveguide core of an input/output waveguide 22, a polarization rotation element 21 and a waveguide-type optical diffraction grating 23 which are included in the optical wavelength filter illustrated in FIGS. 3A and 3B is enclosed by a clad layer (not illustrated), and the waveguide core and the clad layer are formed on a substrate (not illustrated). For example, the waveguide core and the substrate are formed of silicon material, and the clad layer is formed of silicon oxide material.

The optical wavelength filter illustrated in FIG. 3A has a width tapered waveguide used as the polarization rotation element 21. The waveguide core included in the polarization rotation element 21 has a rectangular sectional shape cut in a direction perpendicular to the waveguide direction, and has a terrace-like structure 21s formed in both sides along a light propagating direction in the waveguide core. There exists a portion where a waveguide width of the taper-shaped waveguide core and dimension of the terrace-like structure 21s (width and thickness of the terrace portion) satisfy conditions under which polarization rotation occurs in the polarization rotation element 21. Accordingly, when the input light of either of the light of the TM polarization fundamental propagation mode or the light of the TE polarization fundamental propagation mode or the input light in which the both lights are mixed is input into the taper-shaped waveguide core, polarization of the light of the TM polarization fundamental propagation mode is rotated and the mode is converted into the TE polarization first order propagation mode. On the other hand, the light of the TE polarization fundamental propagation mode is output without conversion.

An optical wavelength filter illustrated in FIG. 3B has a width tapered waveguide used as the polarization rotation element 21, and the waveguide core included in the polarization rotation element 21 has a trapezoidal sectional shape cut in a direction perpendicular to the waveguide direction, and there exists a portion having a waveguide width satisfying conditions under which polarization rotation occurs. Accordingly, when the input light of either of the light of the TM polarization fundamental propagation mode or the light of the TE polarization fundamental propagation mode or the input light in which the both lights are mixed is input into the taper-shaped waveguide core, and polarization of the light of the TM polarization fundamental propagation mode is rotated and the mode is converted into the TE polarization first order propagation mode. On the other hand, the light of the TE polarization fundamental propagation mode is output without conversion.

Also in any of the optical wavelength filters illustrated in FIG. 3A or FIG. 3B, the input/output waveguide 22, the polarization rotation element 21 and the waveguide-type optical diffraction grating 23 are connected in this order in series in the waveguide direction. Input light 6a is input to and output light 6*b* is output from the input/output waveguide 22. The waveguide-type optical diffraction grating 23 is a device which converts the TE polarization fundamental propagation mode into the TE polarization first order propagation mode and outputs it. In addition, conversely, the waveguide-type optical diffraction grating 23 is a device which converts the TE polarization first order propagation mode into the TE polarization fundamental propagation mode and outputs it.

The waveguide-type optical diffraction grating illustrated in each of FIGS. 2A to 2C mentioned above can be used as the waveguide-type optical diffraction grating 23, and the waveguide-type optical diffraction grating 23 has a period in which the TE polarization fundamental propagation mode is diffracted to the TE polarization first order propagation mode.

Even in any case of the optical wavelength filters illustrated in FIGS. 3A and 3B as described above, when the input light 6*a* to the input/output waveguide 22 is in the TE polarization fundamental propagation mode, the input light 6*a* passes through the polarization rotation element 21 as it is, is converted into the TE polarization first order propagation mode in the waveguide-type optical diffraction grating 23, is input again into the polarization rotation element 21, is converted into the TM polarization fundamental propagation mode, and is output as the output light 6*b*. That is, in this case, in the waveguide-type optical diffraction grating 23, wavelength selection (optical wavelength filtering) is carried out, and conversion from the TE polarization fundamental propagation mode into the TM polarization fundamental propagation mode is carried out.

In addition, when the input light 6*a* to the input/output waveguide 22 is in the TM polarization fundamental propagation mode, the input light 6*a* is converted into the TE polarization first order propagation mode in the polarization rotation element 21, is converted from the TE polarization first order propagation mode into the TE polarization fundamental propagation mode in the waveguide-type optical diffraction grating 23, and is again input into the polarization rotation element 21. Thereafter, conversion from the TE polarization first order propagation mode into the TE polarization fundamental propagation mode is carried out, and the output light 6*b* is output. That is, in this case, wavelength selection is carried out in the waveguide-type optical diffraction grating 23, and conversion from the TM polarization fundamental propagation mode into the TE polarization fundamental propagation mode is carried out.

In any way, according to the optical wavelength filter illustrated in FIGS. 3 A and 3B, the optical wavelength filtering is performed, irrespective of polarization direction, on both the input light of the TM polarization fundamental propagation mode and the input light of the TE polarization fundamental propagation mode. Moreover, the polarization direction of the input light is orthogonal to the polarization direction of the output light. The forward wave which travels in the input direction and the reflected wave which travels in the direction reverse to the input direction in the waveguide-type optical diffraction grating 23 have modes in which the order is different, and there is provided the phase adjustment portion which adjusts the phase difference between them. The phase adjustment portion is set so that a sum of a phase of the forward wave and a phase of the reflected wave which are generated in the phase adjustment portion becomes a constant value irrespective of the input mode order.

<<Simulation of Operation Characteristics>>

A result obtained by simulating an operation of the waveguide-type optical diffraction gratings of embodiments illustrated in FIGS. 2A to 2C using three-dimensional finite difference time domain (FDTD) method will be described with reference to FIGS. 4A to 6. In FIGS. 4A to 6, the horizontal axis indicates wavelength scales graduated in a unit of µm, and the vertical axis indicates Bragg reflection factor scales graduated in a unit of dB.

Figure 4A:
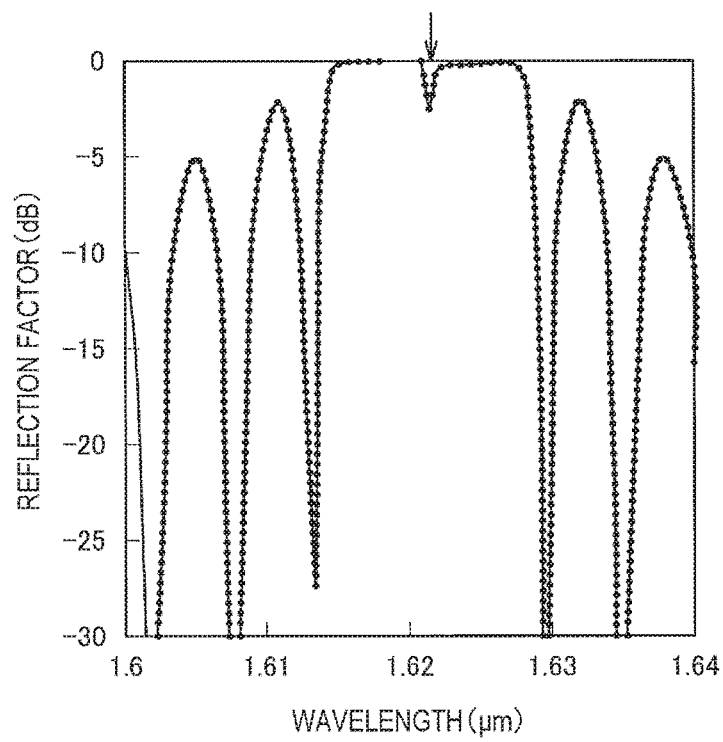
FIGS. 4A and 4B illustrate a reflectance spectrum and a transmission spectrum of a waveguide-type optical diffraction grating of a phase shift type, respectively.
Figure 4B:
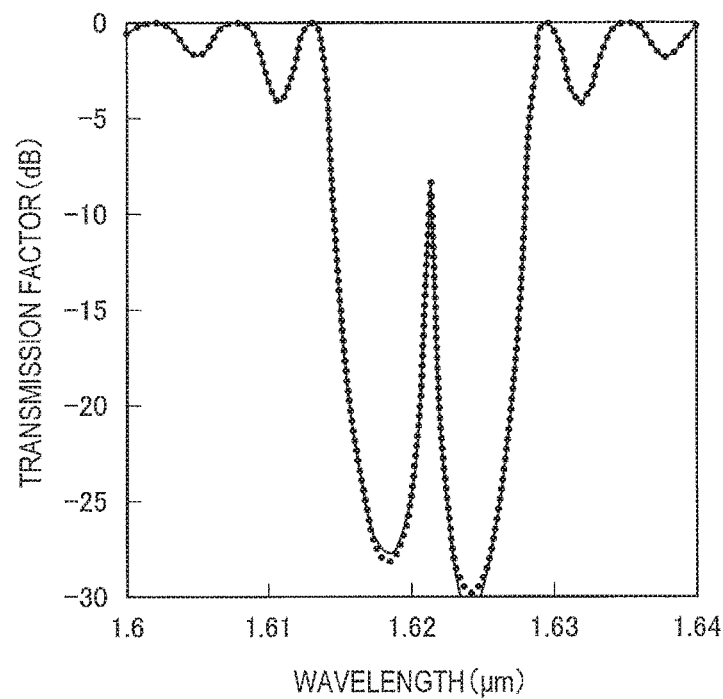

FIGS. 4A and 4B illustrate a reflectance spectrum and a transmission spectrum of the waveguide-type optical diffraction grating of the phase shift type illustrated in FIG. 2A respectively, for a case where the ¼ wavelength shift structure is provided as the phase adjustment portion. FIG. 4A illustrates the reflectance spectrum, and FIG. 4B illustrates the transmission spectrum. Here, a simulation has been performed on the waveguide-type optical diffraction grating of Type A illustrated in FIG. 1A. The thickness of a silicon waveguide core is 300 nm, the full width of the silicon waveguide core is 600 nm, the width of the left-side waveguide area L and the width of the right-side waveguide area R are each 150 nm, the groove depth D is 80 nm, and the full length of the waveguide-type optical diffraction grating of the phase shift type is 100 µm.

A Bragg reflection factor and transmission factor where the TE polarized wave is input and the TM polarized wave is output have been indicated by a solid line, and a Bragg reflection factor and transmission factor where the TM polarized wave is input and the TE polarized wave is output have been indicated by a dotted line. A sharp transmission peak (a dip indicated by a downward arrow in FIG. 4A) unique to the ¼ wavelength shift structure has appeared in the middle of the Bragg reflection region. As illustrated in FIGS. 4A and 4B, almost identical wavelength characteristics are acquired with respect to the TE polarized wave input and the TM polarized wave input.

Figure 5:
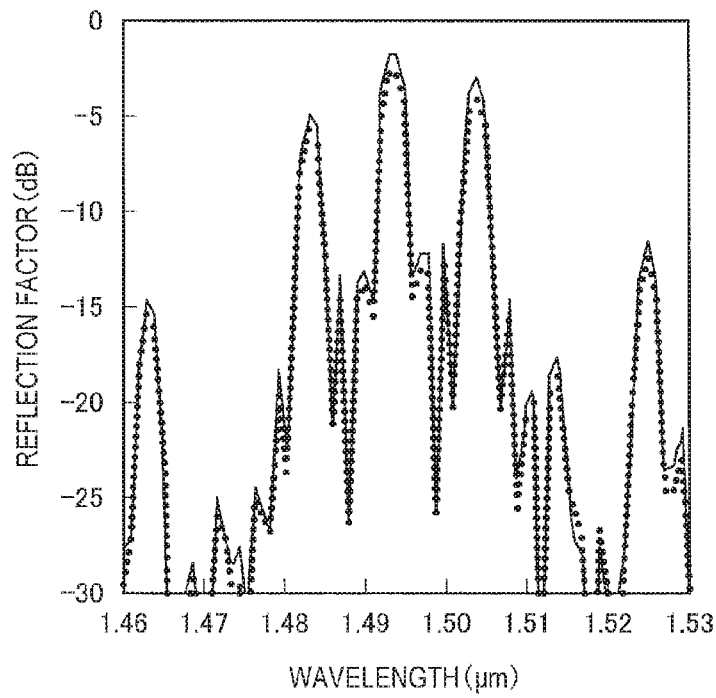
FIG. 5 illustrates a reflectance spectrum of a waveguide-type optical diffraction grating of a sampled grating type.

FIG. 5 illustrates a reflectance spectrum of the waveguide-type optical diffraction grating of the sampled grating type illustrated in FIG. 2B. Here, a simulation has been performed on the waveguide-type optical diffraction grating of Type B illustrated in FIG. 1B. The thickness of a silicon waveguide core is 300 nm, the full width of the silicon waveguide core is 600 nm, and the width of the left-side waveguide area L and the width of the right-side waveguide area R are each 150 nm. In the first portion 3*a* in the left-side waveguide area L and the right-side waveguide area R, D indicated in FIG. 1B is 80 nm, and the full length of the waveguide-type optical diffraction grating of the sampled grating type is 100 µm. The length Zs of each unit is 25 µm. The optical diffraction grating is provided over the half-length in each unit.

In FIG. 5, the Bragg reflection factor where the TE polarized wave is input and TM polarized wave is output is indicated by a solid line, and the Bragg reflection factor where the TM polarized wave is input and TE polarized wave is output is indicated by a dotted line. As illustrated in FIG. 5, almost identical wavelength characteristics are acquired with respect to the TE polarized wave input and the TM polarized wave input.

Figure 6:
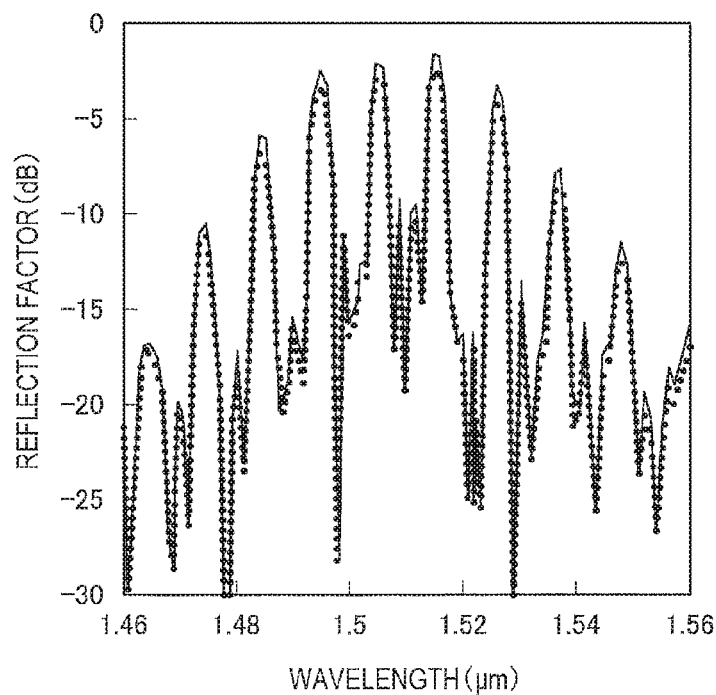
FIG. 6 illustrates a reflectance spectrum of a waveguide-type optical diffraction grating of a super-period grating type.

FIG. 6 illustrates a reflectance spectrum of the waveguide-type optical diffraction grating of the super-period grating type illustrated in FIG. 2C. A simulation has been performed on the waveguide-type optical diffraction grating of Type B illustrated in FIG. 1B. The thickness of a silicon waveguide core is 300 nm, the full width of the silicon waveguide core is 600 nm, and the width of the left-side waveguide area L and the width of the right-side waveguide area R are each 150 nm. In the first portion 3*a* in the left-side waveguide area L and the right-side waveguide area R, D indicated in FIG. 1B is 80 nm, and a full length of the waveguide-type optical diffraction grating of the super-period grating type is 100 μm. The period has been chirped in a range of 313 nm to 323.5 nm. The length Zs of each unit is 25 μm.

In FIG. 6, the Bragg reflection factor where the TE polarized wave is input and TM polarized wave is output is indicated by a solid line, and the Bragg reflection factor where the TM polarized wave is input and TE polarized wave is output is indicated by a dotted line. As illustrated in FIG. 6, almost identical wavelength characteristics are acquired with respect to the TE polarized wave input and the TM polarized wave input.

Figure 7A:
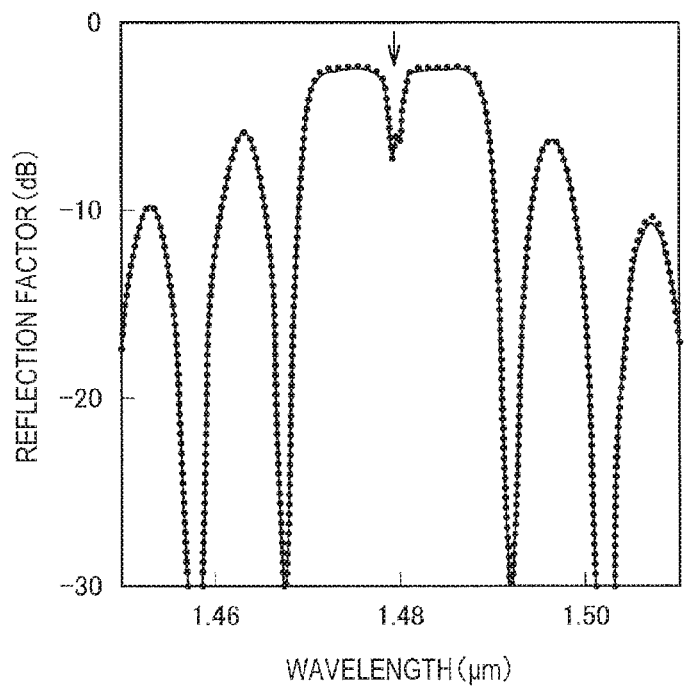
FIGS. 7A and 7B illustrate a reflectance spectrum and a transmission spectrum of an optical wavelength filter respectively, where a width tapered waveguide is used as a polarization rotation element, and a waveguide-type optical diffraction grating having a ¼ wavelength shift structure provided in a phase adjustment portion is used as a waveguide-type optical diffraction grating.
Figure 7B:
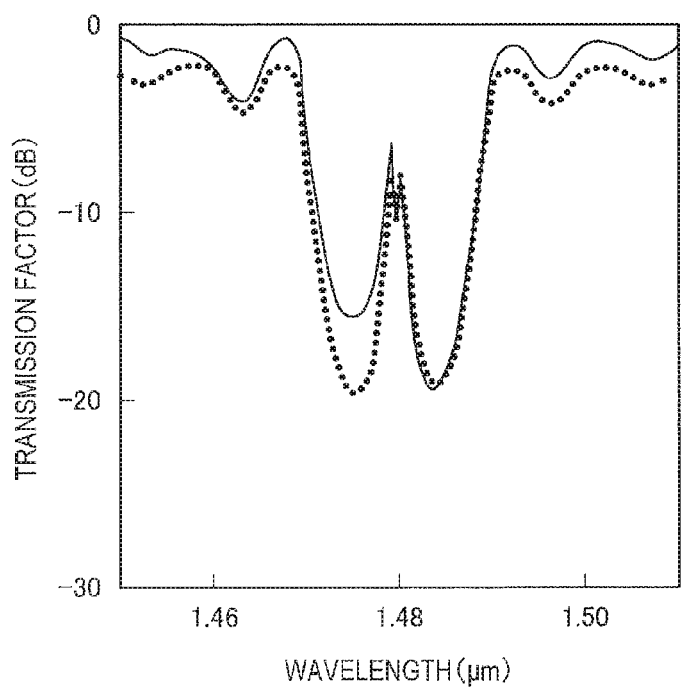

FIGS. 7A and 7B illustrate a reflectance spectrum and a transmission spectrum of the optical wavelength filter illustrated in FIG. 3A, respectively. FIG. 7A illustrates the reflectance spectrum, and FIG. 7B illustrates the transmission spectrum. In FIGS. 7A and 7B, the Bragg reflection factor and transmission factor where the TE polarized wave is input and TM polarized wave is output are indicated by a solid line, and the Bragg reflection factor and transmission factor where the TM polarized wave is input and TE polarized wave is output are indicated by a dotted line. Here, the width tapered waveguide is used as the polarization rotation element 21, in which the sectional shape obtained by cutting the taper-shaped waveguide core in the direction perpendicular to the waveguide direction is the rectangle, and the both sides of the width tapered waveguide portion are formed as terrace-like structures 21s. In addition, a simulation has been performed for a case where the waveguide-type optical diffraction grating of Type A illustrated in FIG. 1A is used as the waveguide-type optical diffraction grating 23, and the ¼ wavelength shift structure is provided as the phase adjustment portion PAP.

The thickness of the silicon waveguide core of the waveguide-type optical diffraction grating 23 is 300 nm, the full width of the silicon waveguide core is 600 nm, the width of the left-side waveguide area L and a width of the right-side waveguide area R are each 150 nm, and the full length of the waveguide-type optical diffraction grating of Type A is 100 μm. The period as the optical diffraction grating is 305 nm. In addition, the polarization rotation element 21 has the terrace-like structure, and the thickness of the polarization rotation element 21 is the same as the waveguide-type optical diffraction grating 23, and the waveguide width including the terrace portion is tapered from 550 nm to 650 nm, and a width of the terrace portion is set to be 150 nm in one side. The terrace-like structure is realized by setting the level difference D indicated in FIG. 3A to be 80 nm.

As illustrated in FIGS. 7A and 7B, almost identical wavelength characteristics are acquired with respect to the TE polarized wave input and the TM polarized wave input. In addition, a sharp transmission peak (a dip indicated by a downward arrow in FIG. 7A unique to the ¼ wavelength shift structure has appeared in the middle of the Bragg reflection region since the waveguide-type optical diffraction grating of Type A illustrated in FIG. 1A is used as the waveguide-type optical diffraction grating 23.

The waveguide-type optical diffraction grating having the high diffraction efficiency is necessary for the purpose of acquiring the Bragg reflection over the wide wavelength band, and the structure of the optical wavelength filter illustrated in FIG. 3A has the high diffraction efficiency (reflection factor) because both the forward wave and reflected wave are the TE polarized waves whose polarization direction is equal in the waveguide-type optical diffraction grating 23. Accordingly, the waveguide-type optical diffraction grating 23 used for the optical wavelength filter illustrated in FIG. 3A has a preferred suitable structure, and is suitable for this kind of grating. Note that, although the center peak in the Bragg reflection region has flat characteristics, this is considered to be caused by multiple reflection within the waveguide-type optical diffraction grating 23.

Figure 8:
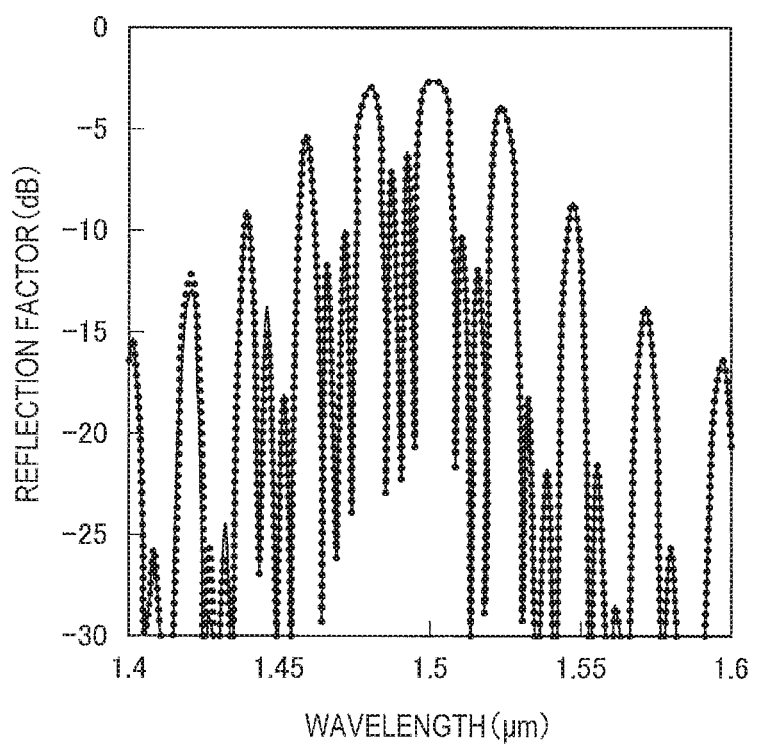
FIG. 8 illustrates a reflectance spectrum of an optical wavelength filter, where a width tapered waveguide is used as a polarization rotation element, and a waveguide-type optical diffraction grating of a super-period grating type is used as a waveguide-type optical diffraction grating.

FIG. 8 illustrates the reflectance spectrum of the optical wavelength filter illustrated in FIG. 3A. Here, the optical wavelength filter has the same structure as the optical wavelength filter on which the simulation has been performed in FIGS. 7A and 7B except for having adopted the waveguide-type optical diffraction grating of the super-period grating type illustrated in FIG. 2C as the waveguide-type optical diffraction grating 23 for the optical wavelength filter. The full length of the waveguide-type optical diffraction grating 23 is 100 μm. The period has been chirped in a range of 313 nm to 323.5 nm. The length Zs of each unit is 25 μm.

In FIG. 8, the Bragg reflection factor where the TE polarized wave is input and TM polarized wave is output is indicated by a solid line, and the Bragg reflection factor where the TM polarized wave is input and TE polarized wave is output is indicated by a dotted line. As illustrated in FIG. 8, a plurality of Bragg reflection peaks have appeared, and almost identical wavelength characteristics are acquired with respect to the TE polarized wave input and the TM polarized wave input. The plurality of Bragg reflection peaks appear because the waveguide-type optical diffraction grating of the super-period grating type has been adopted as the waveguide-type optical diffraction grating 23 for the optical wavelength filter.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A waveguide-type optical diffraction grating comprising:
   a waveguide core that is asymmetric with respect to a thickness direction perpendicular to a light propagating direction,
   wherein
   in the waveguide core, a phase adjustment portion is configured to adjust a phase difference between a forward wave traveling in an input direction and a reflected wave traveling in a direction reverse to the input direction in the waveguide-type optical diffraction grating, and
   the phase adjustment portion is provided in a manner that a sum of a phase of the forward wave and a phase of the reflected wave which are generated in the phase adjustment portion becomes a constant value irrespective of a polarization state of input light to the waveguide-type optical diffraction grating, wherein
   a phase shift portion configured to break a periodic structure is provided in the waveguide core, and
   the phase adjustment portion includes the phase shift portion.

2. A waveguide-type optical diffraction grating comprising:
   a waveguide core that is asymmetric with respect to a thickness direction perpendicular to a light propagating direction,
   wherein
   in the waveguide core, a phase adjustment portion is configured to adjust a phase difference between a forward wave traveling in an input direction and a reflected wave traveling in a direction reverse to the input direction in the waveguide-type optical diffraction grating, and the phase adjustment portion is provided in a manner that a sum of a phase of the forward wave and a phase of the reflected wave which are generated in the phase adjustment portion becomes a constant value irrespective of a polarization state of input light to the waveguide-type optical diffraction grating, wherein in the waveguide core, a plurality of unit regions are provided continuously in a waveguide direction of the waveguide core, the unit region including a non-optical diffraction grating region in which a periodic structure is not formed and an optical diffraction grating region in which a periodic structure provided adjacently to the non-optical diffraction grating region is formed, and the phase adjustment portion is provided in the non-optical diffraction grating region.

3. A waveguide-type optical diffraction grating comprising:

a waveguide core that is asymmetric with respect to a thickness direction perpendicular to a light propagating direction, wherein in the waveguide core, a phase adjustment portion is configured to adjust a phase difference between a forward wave traveling in an input direction and a reflected wave traveling in a direction reverse to the input direction in the waveguide-type optical diffraction grating, and the phase adjustment portion is provided in a manner that a sum of a phase of the forward wave and a phase of the reflected wave which are generated in the phase adjustment portion becomes a constant value irrespective of a polarization state of input light to the waveguide-type optical diffraction grating, wherein in the waveguide core, a plurality of groups of chirped diffraction gratings are provided continuously in a waveguide direction of the waveguide core, and the phase adjustment portion is provided with a boundary of adjacent groups of the chirped diffraction gratings as a center.

4. The waveguide-type optical diffraction grating according to claim 1, wherein a left-side waveguide area, a center waveguide area, and a right-side waveguide area are provided along a waveguide direction in the waveguide core, a width of the left-side waveguide area and a width of the right-side waveguide area are equal, each of optical diffraction grating regions is formed in the left-side waveguide area and the right-side waveguide area respectively, in the optical diffraction grating region, first portion in which a thickness is equal to a thickness of the center waveguide area and second portion in which the waveguide core is gouged to be thinner than the thickness of the center waveguide area and is made to be asymmetric with respect to a thickness direction are provided alternately, and the first portion and the second portion are arranged in laterally antisymmetric positions with the center waveguide area as a center, in the left-side waveguide area and the right-side waveguide area.

5. The waveguide-type optical diffraction grating according to claim 1, wherein a waveguide core is formed of silicon material, and a clad layer which encloses the waveguide core is formed of silicon oxide material.

* * * * *